July 17, 1962     A. ESPOSITO     3,044,507
JIG FOR A POWER SAW
Filed Sept. 15, 1960     2 Sheets-Sheet 2
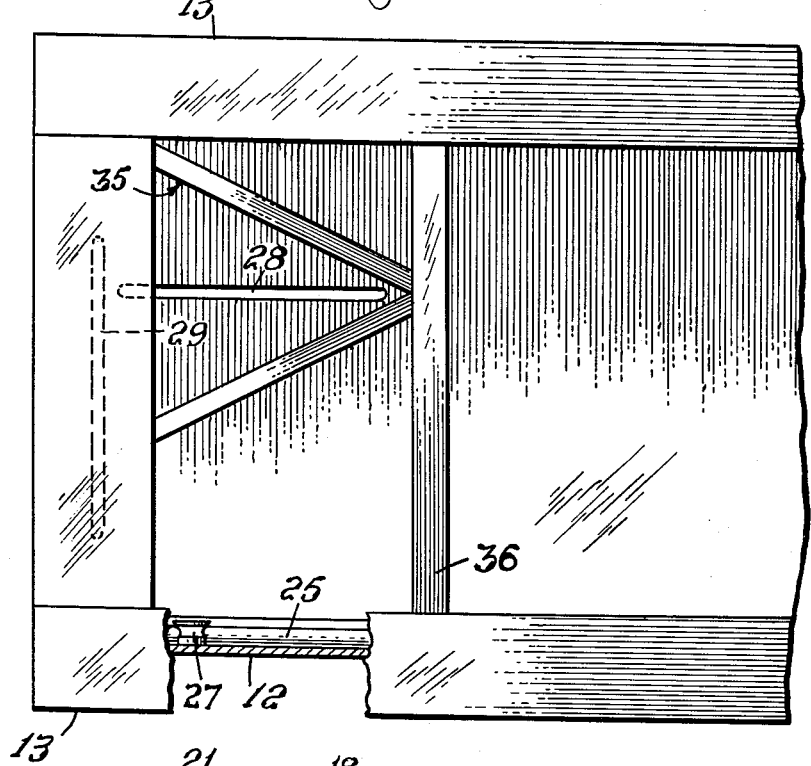
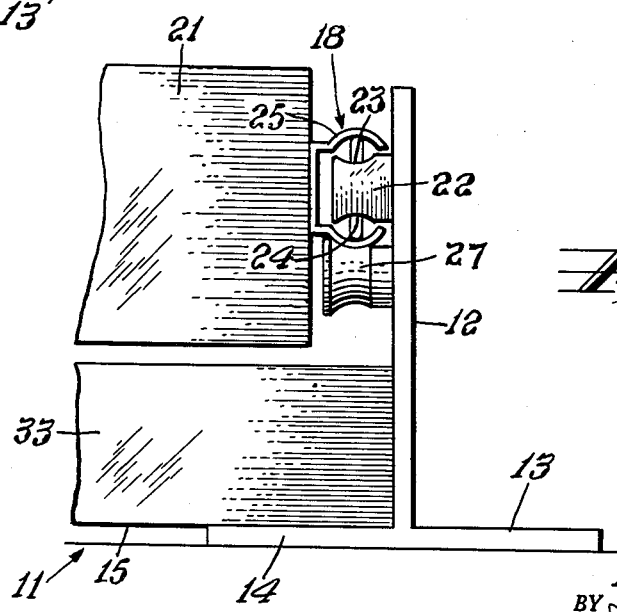
INVENTOR.
Angelo Esposito
BY John N. Bain
ATTORNEY United States Patent Office 3,044,507
Patented July 17, 1962

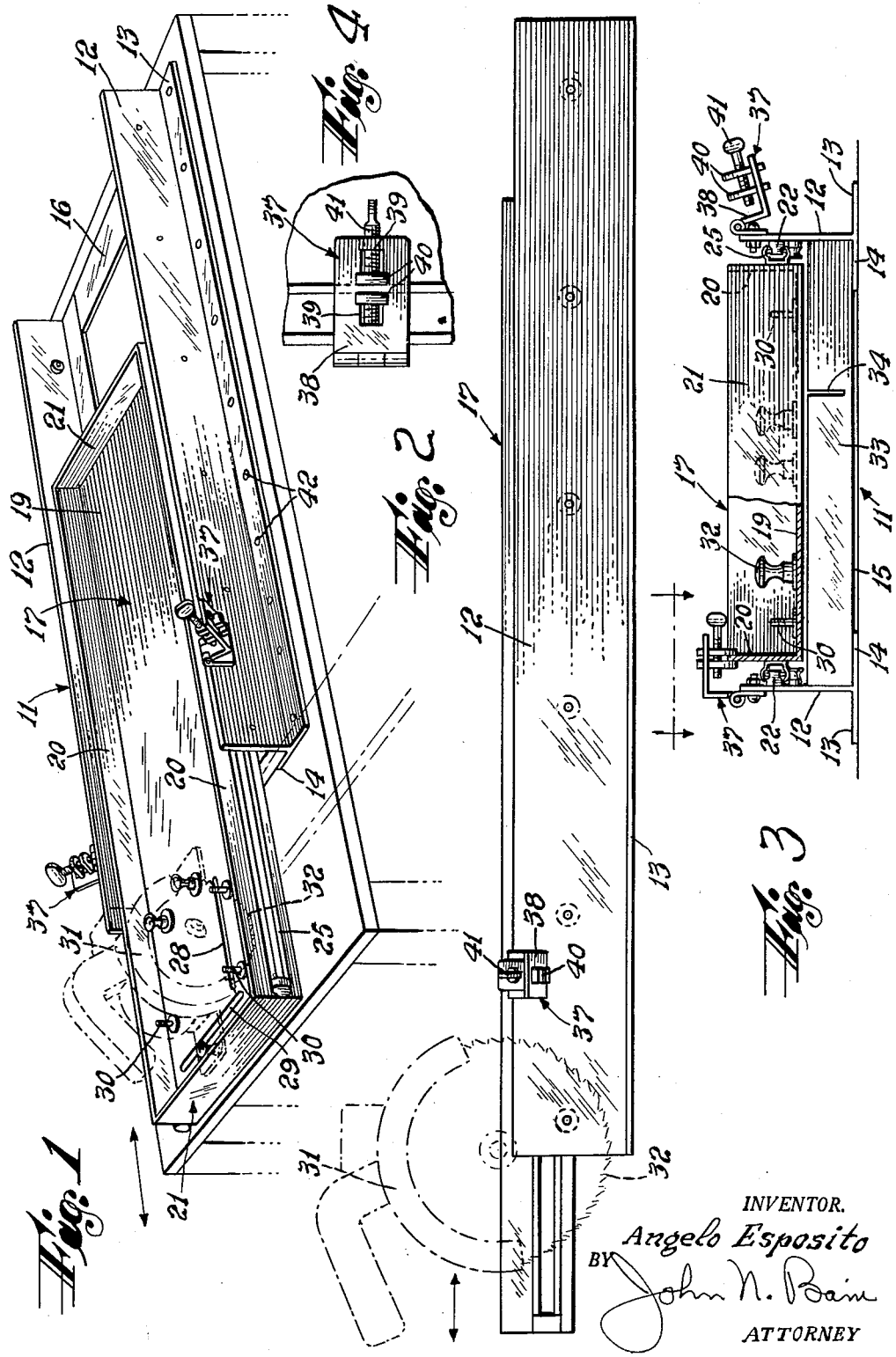

3,044,507
JIG FOR A POWER SAW
Angelo Esposito, 69 Centre St., Belleville, N.J.
Filed Sept. 15, 1960, Ser. No. 56,279
5 Claims. (Cl. 143—47)

My invention relates generally to jigs and specifically to a jig for a power saw.

There are a variety of jigs available today for use with portable power saws. However, none has enjoyed wide commercial usage because of extreme complexity, high cost and limited size of work piece accommodated. In other instances, the jig requires an elaborate and permanent installation which renders them useless for on the job purposes.

Therefore it is among the objects and advantages of my invention to provide a jig for a power saw which may accommodate an extremely large work piece with a relatively small jig frame.

Another object of my invention is to provide a jig for a power saw which is easily portable and which may be supported by any simple table or a pair of carpenter's horses.

A further object of my invention is to provide a jig for a power saw wherein the saw cannot fall, rotate about an axis, or be otherwise moved so as to accidentally injure the operator.

A further object of my invention is to provide a jig for a power saw which will provide a flat, guide surface which may be either perpendicular to or parallel to the plane of the cutting blade.

A still further object of my invention is to provide a jig for a power saw in which the position of the plane of the blade may be changed according to the needs of the work piece cut.

Yet another object of my invention is to provide a jig for a power saw in which the saw blade may be moved through the work piece or the work piece moved under the saw blade.

Yet a further object of my invention is to provide a jig for a power saw in which the power saw is mounted on a slidable tray which may be fully extended away from a rigid mounting frame.

A still further object of my invention is to provide a jig for a power saw in which the saw blade is at all times securely disposed beneath a tray slidable on a plane parallel to the plane of the surface of the work piece to be cut.

Yet another object of my invention is to provide a jig for a power saw in which the blade of the saw may be rigidly positioned at any particular distance from a guide surface against which the work piece may abut.

These objects and advantages as well as other objects and advantages may be achieved by my invention one embodiment of which is illustrated in the drawings in which:

FIGURE 1 is a view in perspective of my portable jig resting on a work table.

FIGURE 2 is a side elevational view of my portable jig for a power saw.

FIGURE 3 is an end view partially cut away.

FIGURE 4 is a top plan view of an adjustable stop.

FIGURE 5 is a bottom plan view of the portable jig.

FIGURE 6 is an end view of a guide rail on which the slidable tray is mounted.

Referring now to the drawings in detail my jig comprises a generally rectangular frame 11. The frame 11 is comprised of a pair of generally parallel, upstanding longitudinal side walls 12, 12. Each side wall 12, 12 is provided with a bottom, horizontal exterior flange 13, 13 and a bottom horizontal interior flange 14, 14. The longitudinal side wall 12 and integral flanges 13, 14 may be fabricated conveniently of a single, T-shaped extrusion of a suitable metal such as aluminum. The frame 11 is closed by a horizontal front end member 15 and a horizontal rear end member 16, each aligned between and having their ends secured to the respective interior horizontal flanges 14, 14 aforesaid.

A longitudinally slidable tray 17 is mounted on the frame 11 between the side walls 12, 12. The tray 17 is adapted to slide upon a rail system 18 to be hereinafter described. The tray 17 is provided with a generally flat, horizontal floor 19 having a pair of upstanding, longitudinal side walls 20, 20 and a pair of upstanding end walls 21, 21 each integrally formed thereon. The tray 17 may be fabricated conveniently of a single blank sheet of some suitable metal such as aluminum with the side walls 20, 20 and end walls 21, 21 bent upwardly therefrom.

The tray 17 slides on a rail system 18 secured between the upstanding side walls 12, 12 of the frame 11 and the upstanding side walls 20, 20 of the tray 17. The respective side walls 12, 12 of the frame 11 are each provided with a longtudinal interior race 22 having an upper longitudinal groove 23 and a lower horizontal groove 24.

The interior race 22 may be extruded of aluminum or some other suitable material in long continuous segments and thereafter cut to length and fastened in place. Each side wall 20, 20 of the tray 17 is provided with a longitudinal exterior race 25 having a generally C-shaped configuration. The vertical wall of the exterior race 25 is secured to the side wall 20 of the tray 17. The upper and lower curved portions of the exterior race 25 cooperate with the upper and lower grooves 23, 24 of the interior race 22 to provide a channel for bearings upon which the tray 17 is slidably supported. Suitable stops may be provided to prevent disengagement of the tray 17 from the frame 11. In addition, a roller 27 is secured to each side wall 12, 12 of the frame 11 near its front end. The rollers 27, 27 respectively engage the underneath portion of the exterior races 25, 25 lending frictionless support thereto.

The tray 17 is provided with a longitudinal slot 28 near its front end. In addition the tray 17 is provided with a latitudinal slot 29 positioned at right angles to the longitudinal slot 25. A plurality of threaded mounting pins 30 are secured to the floor 19 of the tray 17 about the slots 28, 29. The mounting pins 30 are adapted to engage the base plate of a portable power saw 31 thereby securing it to the floor 19 of the tray 17 with its blade 32 projecting through either the longitudinal slot 28 or the latitudinal slot 29. The saw 31 is secured against disengagement from the mounting pins 30 by means of finger nuts 42 threadably engaged with the pins 30.

The tray 17 and frame 11 are so dimensioned that the blade 32 of the saw 31, when fully extended, will project through either slot 28, 29 beneath the floor 19 of the tray 17 to a point a short distance above the top surface of the front end member 15. A vertical guide wall 33 is secured between the side walls 12, 12 of the frame 11 at the front thereof and extends upwardly to a plane a short distance beneath the floor 19 of the tray 17. The guide wall 33 is provided with a vertical slot 34 which is aligned with a plane passing vertically through the longitudinal slot 28 in the floor 19 of the tray 17. The vertical slot 34 extends from the upper edge of the guide wall 33 downwardly to a point slightly above its bottom edge. The vertical slot 34 is adapted to permit passage of the blade 32 of the saw 31 from a position within the confines of the rectangular frame 11 to a position without thereof in response to outward movement of the sliding tray 17 when the blade 32 is projecting through the longitudinal slot 28. The entire assembly should be so dimensioned that the slot 34 is long enough to accommodate the blade 32 in its lowermost position. In this respect it should be noted that most power saws are adjustable with respect to the vertical position of the blade.

Secured to the frame 11 beneath the longitudinal slot 28 and latitudinal slot 29 is a V-shaped sawdust trap or guide open at the bottom 35. The apex of this trap 35 is secured to a latitudinal, intermediate cross member 36 secured between the side walls 12, 12 of the frame 11. The legs of the trap 35 are secured to the guide wall 33 on each side of the vertical slot 34. The trap 35 is not symmetrical in that its leftmost leg extends far to the left of the vertical slot 34 so as to insure that the latitudinal slot 29 in the tray 17 is encompassed within the confines of the trap 35.

The side walls 12, 12 of the frame 11 are each provided with an adjustable stop 37. The stop 37 comprises an L-shaped support member 38 which may be rigidly secured to the side wall 12 or may be pivotally secured thereto by a hinge 39 as is shown in the drawings. The support member 38 is provided with a pair of generally rectangular openings 39, 39 each having a downwardly extending leg 40 slidably secured therein. Each leg 40 is provided with a tapped hole into which there is secured an adjustment bolt 41. The adjustment bolt 41 is provided with a male threaded portion and a female threaded portion respectively adapted to engage opposite legs 40, 40. Rotation of the bolt 41 causes the legs 40 to either diverge or converge to engage the side wall 20 of the tray 17 thereby securing it against movement.

In order to rip-cut a work piece, the saw 31 is mounted table or across a pair of carpenter's horses. In the alternative it may be rigidly secured to a work bench by means of screws passing through holes 42 provided in the external flanges 13, 13 on the side walls 12, 12. The work piece may be placed on the work bench in front of the rectangular frame 11. The front cross member 15 and guide wall 33 cooperate to present a flat, guide surface. The frame 11 and tray 17 are carefully constructed so that the blade 32 of the saw 31 will lie either perpendicular to the guide wall 33 or parallel thereto for exact mitering.

In order to rip-cut a work piece, the say 31 is mounted with the blade 32 passing through the longitudinal slot 28 in the tray 17. The handle of the saw 31 may be oriented so that it may be conveniently grasped by the operator standing in front of the jig. The work piece is positioned to abut against the guide wall 33 of the jig, and the adjustable stops 37 loosened. The saw 31 is then actuated and pulled outwardly by means of its handle. The tray 17 is free to slide outwardly in response thereto with the blade 32 passing through the slot 34 in the guide wall 33 and thereafter engaging the work piece to make a precisely controlled straight cut. The tray 17 may be extended outwardly nearly its entire length since the rail system 18 on which it rides secures it against rotation with respect to its center of gravity. In addition the roller supports 27 beneath the exterior race 25 provide further support for the tray 17 when fully extended. The sawdust trap 35 prevents sawdust being thrown onto the rail system 18 which would jam the sliding action of the tray 17 and render the device useless.

To cross cut a work piece, the tray 17 is extended outwardly the desired distance. The saw 31 is then oriented so that the blade 32 projects through the latitudinal slot 29. The tray 17 is then firmly secured in position by means of the adjustable stops 37. The work piece is fed into the saw blade 32 using the guide wall 33 as a guide to insure a straight cut. The fact that the tray 17 may be extended almost its entire length, permits cutting of extremely large work pieces. In addition the work piece may be pulled away from the guide wall 33 and out from beneath the tray 17 without the interference from the frame 11. The construction of my jig insures that the cutting edge of the saw blade 32 is at all times positively secured beneath the tray 17. The saw 31 cannot be raised or lowered on chains or pulley nor can it be rotated upwardly about some axis which creates a danger to the operator. At the same time, my jig is equally as versatile in its mode of operation and can even accommodate larger work pieces than jigs having a potentially dangerous structure.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A jig for a power saw comprising a generally rectangular frame, a tray slidably mounted on the frame, a power saw mounted on top of the tray at one end thereof, the tray being slidably extensible on the frame to permit positioning of the blade of the saw both within the confines of the frame and beyond one end thereof, the tray also having a longitudinal slot and a latitudinal slot, and means for mounting a power saw on the tray with the cutting blade projecting downwardly through either of the said slots.

2. A jig for a power saw comprising a generally rectangular frame, a tray mounted on the frame, the tray being movable longitudinally in a generally horizontal plane but immovable vertically, latitudinally and rotationally with respect to the frame, a power saw mounted on top of the tray at one end thereof, the tray being slidably extensible on the frame to permit positioning of the blade of the saw both within the confines of the frame and beyond one end thereof, a generally horizontal flat floor on the tray having a longitudinal slot and latitudinal slot at one end, and means for mounting said power saw on the tray with the cutting blade projecting downwardly through either of the said slots.

3. A jig for a power saw comprising a generally rectangular frame, a tray mounted on the frame between a pair of bearing supported rails, a power saw mounted on top of the tray at one end thereof, the tray being slidably extensible on the frame to permit positioning of the blade of the saw both within the confines of the frame and beyond one end thereof, the tray also being slidable longitudinally in a generally horizontal plane but immovable vertically, latitudinally and rotationally with respect to the frame, a generally horizontal flat floor on the tray having a longitudinal slot and a latitudinal slot in one end, means on the floor of the tray for detachably mounting a power saw thereon with its cutting blade projecting downwardly through either of the said slots, a vertical guide wall extending latitudinally across the frame at one end and having a vertical slot therein lying in a plane passing perpendicularly through the longitudinal slot in the tray.

4. A jig for a power saw comprising a generally rectangular frame, a tray mounted on the frame between a pair of bearing supported rails, a power saw mounted on top of the tray at one end thereof, the tray being slidably extensible on the frame to permit positioning of the blade of the saw both within the confines of the frame and beyond one end thereof, the tray also being slidable longitudinally in a generally horizontal plane but immovable vertically, latitudinally and rotationally with respect to the frame, a generally horizontal flat floor on the tray having a longitudinal slot parallel to the line of movement of the tray and a latitudinal slot perpendicular to the longitudinal slot, both slots being located at one end of the floor, means on the floor of the tray for detachably mounting a power saw thereon with its cutting blade projecting downwardly through either of the said slots, and a vertical guide wall extending latitudinally across the frame at one end thereof and having a vertical slot therein lying in a plane passing perpendicularly through the longitudinal slot in the floor of the tray.

5. A jig for a power saw comprising a generally rectangular frame, a tray mounted on the frame, a power saw mounted on top of the tray at one end thereof, the tray being slidably extensible on the frame to permit positioning of the blade of the saw both within the confines of the frame and beyond one end thereof, the tray also being movable longitudinally in a generally horizontal plane but immovable vertically, latitudinally and rotationally with respect to the frame, a generally horizontal flat floor on the tray having a longitudinal slot and a latitudinal slot at one end, means on the floor of the tray for mounting a power saw thereon with its cutting blade projecting downwardly through either of the slots, a vertical guide wall secured to the frame at one end and having a vertical slot therein lying in a plane passing perpendicularly through the longitudinal slot in the floor of the tray, and a V-shaped member secured to the frame beneath the slots in the tray having its base secured to the guide wall on opposite sides of the vertical slot therein and defining a saw dust trap.

References Cited in the file of this patent

UNITED STATES PATENTS

| | | |
|---|---|---|
| 206,648 | Tucker | July 30, 1878 |
| 344,066 | Tollner | June 22, 1886 |
| 1,045,523 | Cassey | Nov. 26, 1912 |
| 1,457,492 | Bloodgood | June 5, 1923 |
| 1,872,718 | Flanigan | Aug. 23, 1932 |
| 2,629,410 | Cadwell | Feb. 24, 1953 |
| 2,630,147 | Garberg | Mar. 3, 1953 |
| 2,708,463 | Coleman | May 17, 1955 |
| 2,810,412 | Roug | Oct. 22, 1957 |
| 2,818,892 | Price | Jan. 7, 1958 |

FOREIGN PATENTS

| | | |
|---|---|---|
| 783,112 | Great Britain | Sept. 18, 1957 |